(12) United States Patent
Brown et al.

(10) Patent No.: US 6,917,672 B2
(45) Date of Patent: Jul. 12, 2005

(54) THIRD PARTY REGULATION OF CALLS BASED ON THE CALLER AND CALLEE PAIR TO A CALL

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/081,017

(22) Filed: Feb. 21, 2002

(65) Prior Publication Data

US 2003/0156695 A1 Aug. 21, 2003

(51) Int. Cl.[7] .............................................. H04M 3/00
(52) U.S. Cl. .............. 379/188; 379/142.05; 379/210.02
(58) Field of Search ........................... 379/88.01, 88.02, 379/88.19, 88.2, 88.21, 114.14, 142.01, 142.06, 142.1, 142.11, 161, 188, 210.02, 68, 71, 142.05

(56) References Cited

U.S. PATENT DOCUMENTS

| | | | |
|---|---|---|---|
| 5,499,288 A | 3/1996 | Hunt et al. ................... 379/88 |
| 5,566,229 A | 10/1996 | Hou et al. ..................... 379/88 |
| 5,673,404 A | 9/1997 | Cousins et al. ............. 395/347 |
| 5,724,408 A | 3/1998 | Morganstein ............... 379/88.2 |
| 5,790,637 A | 8/1998 | Johnson et al. ................ 379/67 |
| 5,915,001 A | 6/1999 | Uppaluru .................. 379/88.22 |
| 5,940,476 A | 8/1999 | Morganstein et al. .... 379/88.02 |
| 5,946,654 A | 8/1999 | Newman et al. ............ 704/246 |
| 5,978,467 A | 11/1999 | Walker et al. ......... 379/266.01 |
| 6,038,305 A | 3/2000 | McAllister et al. ......... 379/207 |
| 6,058,364 A | 5/2000 | Goldberg et al. ........... 704/252 |
| 6,101,242 A | 8/2000 | McAllister et al. ...... 379/88.02 |
| 6,122,357 A | 9/2000 | Farris et al. ................. 379/207 |
| 6,178,230 B1 | 1/2001 | Borland ..................... 379/67.1 |
| 6,178,240 B1 | 1/2001 | Walker et al. ......... 379/266.01 |
| 6,327,346 B1 | 12/2001 | Infosino .................. 379/88.02 |
| 6,359,971 B1 | 3/2002 | Haimi-Cohen et al. .. 379/88.01 |
| 6,724,866 B2 | 4/2004 | Kuhn et al. ............. 379/88.21 |
| 2003/0156695 A1 | 8/2003 | Brown et al. ................ 379/188 |
| 2003/0156707 A1 | 8/2003 | Brown et al. .......... 379/201.01 |

FOREIGN PATENT DOCUMENTS

| | | | | |
|---|---|---|---|---|
| EP | 0585004 A2 | 3/1994 | ............ H04M/3/44 |
| EP | 0676882 A2 | 10/1995 | ............ H04M/1/27 |
| JP | 8139797 A | 5/1996 | .......... H04M/1/274 |
| JP | 10294784 A | 11/1998 | ............ H04M/1/57 |

*Primary Examiner*—Bing Q. Bui
(74) *Attorney, Agent, or Firm*—Mark S. Walker; Amy J. Pattillo

(57) ABSTRACT

A method, system, and program for third party regulation of calls based on the caller and callee pair to the call. An identity of a caller to a call and an identity of a callee logged in to receive the call are detected. A selection of third party criteria for regulating a call between the caller identity and the callee identity are accessed. A communication channel between the caller and the callee is regulated according to the selection of third party criteria.

39 Claims, 10 Drawing Sheets

THIRD PARTY REGULATION OF CALLS BASED ON THE CALLER AND CALLEE PAIR TO A CALL

CROSS-REFERENCE TO RELATED APPLICATIONS

The present application is related to the following co-pending applications:

(1) U.S. patent application Ser. No. 10/081,014; and
(2) U.S. patent application Ser. No. 10/081,029.

BACKGROUND OF THE INVENTION

1. Technical Field

The present invention relates in general to telecommunications and, in particular, to call party identification. Still more particularly, the present invention relates to regulating calls to caller and callee pairs according to third party criteria.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

One problem created by telephone service is the intrusion of unwanted calls or the placement of calls to parties that are undesirable. For example, a parent may want to limit the parties to which a minor may place calls or to which a minor may receive calls. A parent may block certain numbers, such as "900" numbers from being dialed from a home telephone line. However, the minor may still place calls to those numbers from other telephone lines, such as a pay telephone.

In another example, more and more employees are carrying personal wireless telephones during the work day. While the business may gain some benefit from the employee having an additional communication interface, a personal wireless telephone may also serve as a vehicle for employees to receive or place calls during the workday that are undesirable to the employer. Currently, employers only have the choice of requesting employees to turn off wireless telephony devices during the work day.

Therefore, in view of the foregoing, it would be advantageous to provide a method, system, and program, for regulating phone calls independent of the line from which a call is placed or received. In particular, it would be advantageous to regulate calls based on third party criteria indicating the identities of pairs of individuals between which the third party regulates calls.

SUMMARY OF THE INVENTION

In view of the foregoing, it is therefore an object of the present invention to provide an improved telecommunications system.

It is another object of the present invention to provide a method, system and program for improved call party identification.

It is yet another object of the present invention to provide a method, system and program for regulating calls to caller and callee pairs according to third party criteria.

According to one advantage of the present invention, an identity of a caller to a call and an identity of a callee logged in to receive the call are detected. A selection of third party criteria for regulating a call between the caller identity and the callee identity are accessed. A communication channel between the caller and the callee is regulated according to the selection of third party criteria.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
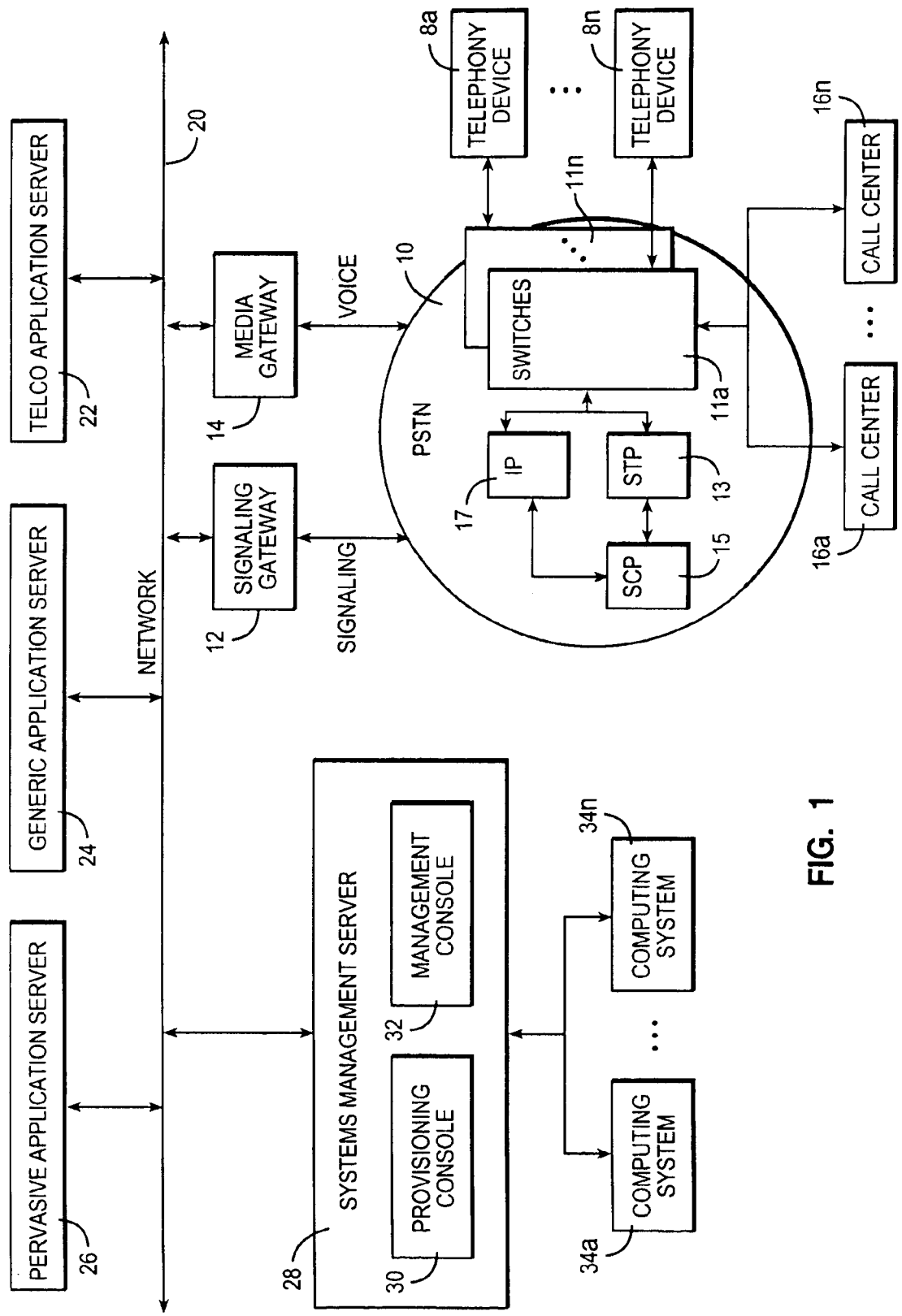
FIG. 1 depicts a block diagram of a network environment in which the present invention may be implemented.

A method, system, and program for regulating calls according to third party criteria are provided. In a preferred embodiment, the third party criteria regulates calls according to the caller and callee pairs. In particular, the third party criteria focuses on regulating calls to and from a particular individual or business that the third party has authority over. Calls placed by or received by the regulated individual or business are specifically regulated according to the other party involved in the call, creating a caller and callee pair. Advantageously, a third party may assign specific criteria to regulate caller and callee pairs via telephone lines supplied by the third party or via telephone lines operated independently of the third party. The third party may include, for example, a business, a parent, a court, or other authority that a party allows authority or is required to allow authority over calls.

In particular, third party criteria regulating caller and callee pairs may be further enhanced by other call context. For purposes of the present invention, context may include, but is not limited to, the identity of the caller or callee, the device identity and owner, the location of the caller and callee, the path of a call, and billing information for the caller and callee. Location of the caller and callee may include, but is not limited to, the time zone, country, state, city, building location, or GPS location of a caller or callee.

Determination of context and regulation of calls according to context are preferably performed by a context inference service and a context rating service located within an Intelligent Peripheral of the trusted telephone network, located within a telecommunications (Telco) Application service outside the trusted telephone network and/or located within a private switching network. As will be further described, the Telco application service located outside the trusted telephone network is enabled to provide services to callers and callees via enhanced security channels.

Identity authentication is preferably performed by authenticating the voices of the caller and callee. Identity authentication may be initiated by the origin device originating the call, the intermediary device processing the call, or the destination device receiving the call. Each of the devices may access a third party or external server to perform the identity authentication. Performance of identity authentication has different advantages depending on the device initiating the identity authentication.

While as described, authentication of a caller or callee identity is described with emphasis placed on voice authentication, other methods of caller and callee identity authentication may also be performed. Voice samples utilized for voice authentication are just one of multiple types of biometric sampling. For example, a caller or callee may locally provide an eye scan, a fingerprint, and other biophysical identifiers that are transmitted within or outside the trusted network to authenticate the identity of the caller or callee.

Other context information is received, determined and inferred from context clues. Context clues may include the identities of the caller and callee, the line numbers, the line subscriber profiles, caller/callee profiles, and other parameters associated with the call. As a call is transferred and forwarded, context clues for each portion of a call path are gathered and utilized to update the context of the call.

Before or during a call, the call may be regulated by third party regulation criteria. The third party regulation criteria preferably regulates calls based on the context of the call, rather than just a line number accessed during a call. The caller or the callee may be regulated according to the third party regulation criteria.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In addition, for purposes of the present invention, a trusted telephone network preferably includes a traditional trusted telephone network, however also includes, but is not limited to, an Internet Protocol telephony network, a digital telephone network, and other communication networks.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

Network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

Advantageously, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. Advantageously, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a caller may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a–11n and telco application server 22 via signaling gateway 12. In addition, a voice channel is opened between central office switches 11a–11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a–11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. For purposes of the present invention, the business that the caller is calling on behalf of is also indicated in the VID. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. Advantageously, the identity of the actual caller or actual callee is output to a display in association with a call. In addition, other context information about the caller including, but not limited to, the device from which the call originates or is answered, ratings for a caller or callee, and other context information may be output to a display in association with a call. In particular, where output of the identity of the actual caller or actual callee is blocked, display of other context information may not be blocked, such that context for the call may be provided without revealing the actual identity of the caller or callee.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to transfer the call if appropriate, to apply distinctive ringing, etc.

Authentication of the identity of the caller is preferably initiated in IP 17 or telco application server 22. Once a VID for a caller is received at a central office switch, a context inference application is initiated in IP 17 or telco application server 22. The context inference service preferably requests a caller profile according to VID to determine billing information and personal information about the caller. In addition, the context inference service preferably determines the identity of the device utilized by accessing a device directory, prompting the caller to indicate the device identity, or other methods. Further, the location of the device may be inferred from information provided by the central office switch originating the call, a GPS location, and the location assigned to a line number. Other context information, such as the subject matter of a call and the role in which a caller is placing the call, are preferably determined as wel. The context information is preferably loaded with the VID at the central office switch.

The context information may be filtered at the central office switch according to general filtering preferences indicated by a caller in the caller profile. In addition, context information may be filtered according to caller filtering preferences specifically selected for the callee. Context information is then transferred with the call routed by one or more central office switches to a destination central office switch that services the called party's station or line.

Then, the context information is forwarded with a caller VID to the callee device. The callee is enabled to determine whether to answer a call, transfer the call to voice mail, or select from other call handling options, based on knowing the identity of the caller and the context of the call.

In particular, the caller may provide the line number requested and/or may enter an identifier for the intended callee. A search engine may be accessed within IP 17 or telco application server 22 that queries at least one device associated with a callee to attempt to locate the intended callee. A callee profile accessible according to the intended callee identity may include line number subscriptions and recently used line numbers, such that the search engine may query those line numbers to locate the intended callee.

In addition, authentication of the identity of a callee answering the call is preferably initiated in IP 17 or telco application server 22. Once a RVID for a callee is received at a central office switch, a context inference application is initiated in IP 17 or telco application server 22 to determine the context of the callee side of a call. The callee context information is preferably filtered according to callee preferences and transferred to the caller, such that the caller is provided with an identity of the callee.

As a call is forwarded or transferred to other callers and callees, IP 17 or telco application server 22 are preferably initiated to update the context for a call. For example, the context may indicate the path of line number accessed in a call and whether the call was transferred or forwarded.

Further, advantageously, a context regulation service located within IP 17 or telco application server 22 preferably determines whether a current call should be blocked, transferred to a screening process, or controlled by other regulatory actions. The context regulation service preferably receives third party regulation criteria designating the context in which regulatory actions should be taken. Parties to a call may be provided with a choice to allow regulation or regulation may be required, particularly when a third party provides the telephone system utilized by one of the parties to a call.

Figure 2:
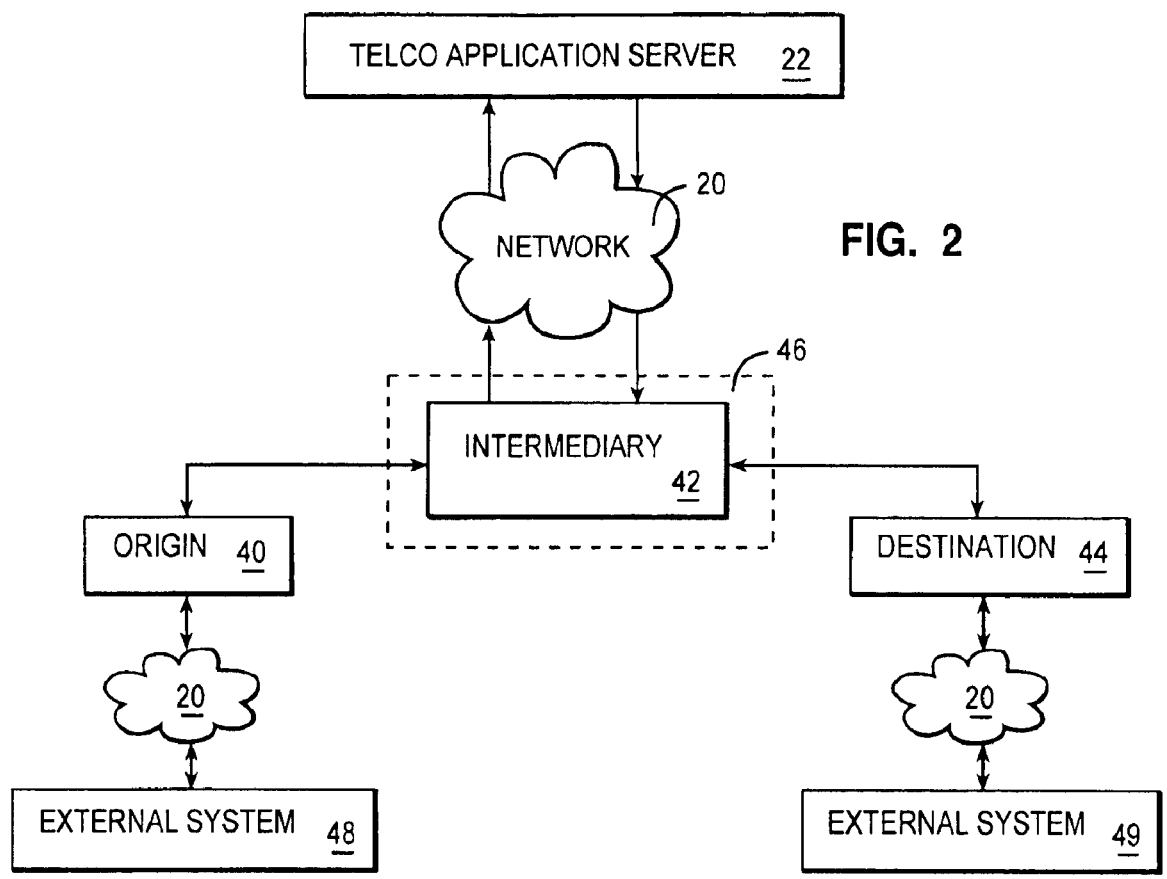
FIG. 2 illustrates a block diagram of an identification system in accordance with the method, system, and program of the present invention.

Referring now to FIG. 2, there is illustrated a block diagram of an identification system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation (IBM)) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In particular, both the identity of an intended callee and the identity of an accessed callee may be determined in RVIDS. The intended callee RVID may be authenticated, for example, from a messaging system utilized by the callee.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference services that perform context inference services. A context inference service may utilize context information gathered from multiple databases and may gathered context information directly from a caller or callee in response to prompts.

Context may include, but is not limited to, an intended callee, a subject matter of a call, a device identity, the location of an origin or destination device, billing information, service subscriptions, the path of a call, and other information which may provide a caller or callee with context of a call. Call context may indicate when a call is made or received on behalf of another individual or business. In addition, call context may indicate in the path of a call whether a backup for the intended caller is accessed.

Information for determining the context of a call may be gathered from a caller or callee profile, from routing information utilized by intermediary 42 from a device directory, from systems management server 28, or other databases of information. Particularly helpful for determining context, calendaring and other electronic scheduling databases included in a caller or callee profile may be utilized to determine location, subject, and times available for a call. In addition, the context inference service may, for example, infer the subject matter of a call as either business or personal based on the identity of the device from which a call originates and the location of that device. Alternatively, the subject of a call as either a business subject or personal subject may be inferred from the billing information context.

From the context of a call, a rating of the caller and/or callee may be determined by a context rating service executing within intermediary device 42 or telco application server 22. In particular, individual ratings may be associated with each portion of the context of a call. In particular, the ratings are preferably determined based on previous ratings for the caller, callee, and/or other context. In addition, both globally accessible and locally accessible databases may store previous ratings.

In addition, from the context of a call, any required regulation of the call may be determined by a context regulation service executing within intermediary device 42, telco application server 22, or a private switching network. Most likely, a third party will designate context based criteria for regulating calls indicating the identities of parties and identities of businesses called on behalf of to be regulated. However, other types of context, including, but not limited to, the location of parties, the subject of the call, the ratings of parties, and the events occurring during the call, may be designated as criteria for regulating a call.

Figure 3:
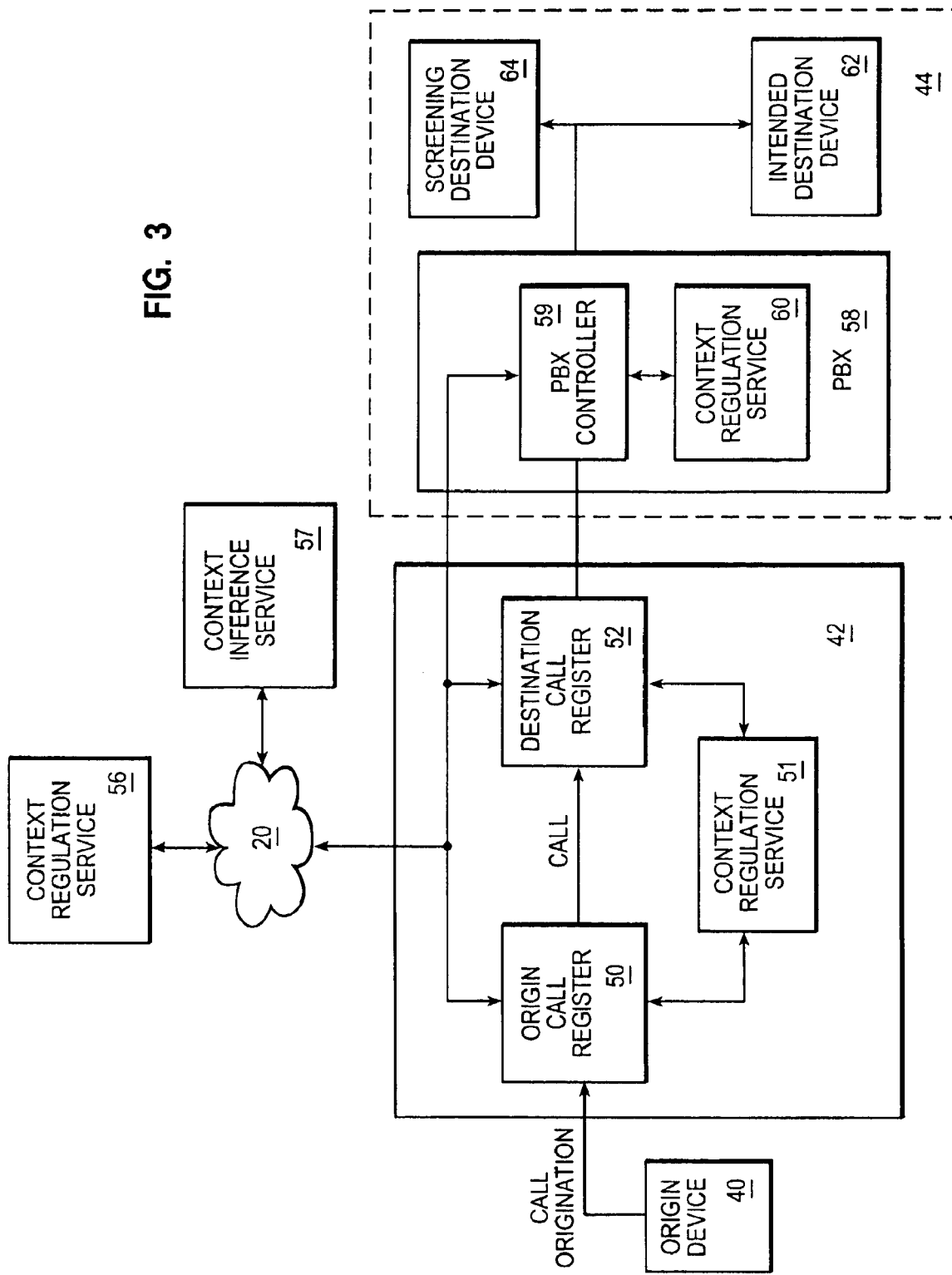
FIG. 3 depicts a block diagram of the flow of a call for context regulation in accordance with the method, system, and program of the present invention.

A VID or RVID may be transferred in multiple protocols, including, but not limited to, Interface Definition Language (IDL) and Extensible Markup Language (XML). A VID or RVID may include a range of information, where each type of information may be tagged or identified in some other manner. For example, the following tagged VID may be transmitted to represent an authenticated identity of a caller and context of the call:

[caller name] Jon Smith, sales person
[caller rating]+4
[caller device] Jane Doe's cell phone
[caller location] Central Time zone, Austin, Tex.
[caller on behalf of] Business XYZ
[call subject] Product A
[call subject rating]−2
[call billing] Jon Smith's business service provider C
[authenticated by] Jane Doe's cell phone, service provider C
[callee] Sarah Doe
[callee device] Business handset With reference now to FIG. 3, there is depicted a block diagram of the flow of a call for context regulation in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service may be located within trusted network 46 as an IP or located outside trusted telephone network 46 within a telco application server accessible via network 20, such as context inference service 57.

The context inference service preferably determines context for a call including, but not limited to, who is calling, an intended callee, the device utilized to place the call, the location of the caller, the billing method for the call, the path of the call, and/or the subject matter of the call. In addition, the context inference service preferably determines context for a call including, but not limited to, who receives a call, the path of line numbers utilized to access the callee, the device utilized to receive the call, the location of the callee, and the subject matter available for discussion by the callee. In addition, other categories of context may be determined.

To determine the context of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

In addition to determining the identity of a person associated with a line number, detecting and/or inferring the identity of the device itself is particularly advantageous context information. Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is installed for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

The VID provides the context of who is placing the call. The caller profile provides further context based on the billing information and service subscriptions of the caller. For purposes of the present invention, the caller profile may indicate the business on behalf of which a caller places calls and the expertise area of that caller.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference service may infer the subject matter of a call based on the caller's schedule. The context inference service may also infer the subject matter of a call based on the caller's business, expertise, or the business associated with the line number utilized by the caller.

In addition, a caller profile may include multiple roles that a caller takes. For example, a caller may be a parent, a business person, a coach, and a volunteer. The context inference service may infer which role the caller is taking depending on other context or may prompt the caller to select a role. Further, the caller may select, at origin device 40, a role for the call when placing the call request.

The context information for the call is transferred to destination device 44, such that the callee is provided with a context for the call. The context information available in destination call register 52 may be filtered prior to transmittal to destination device 44 according to filtering preferences associated with the device, a line subscriber, or the callee. In addition, destination device 44 may filter the context displayed to a callee according to the device capabilities and preferences selected for the device.

Current relevant events for a callee may be determined as part of the context of a call. In particular, an electronic calendar may be accessed according to a callee identity from a caller profile or from an external calendaring data management system. In addition, where other devices are detected within a local network area of the origin device 40, electronic schedules and other event information may be accessed about a current event for the caller from the other devices or according to the identities of other parties participating in an event with the caller. A current relevant event may include a meeting, appointment, location, others involved in the event, duration of the event, and other information that describes the previous, current, or future environments in which a callee may be located.

Advantageously, the destination service provider may initiate a context inference service to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

In particular, the identity of the callee answering the call is preferably authenticated and profiles accessed for the line line subscriber and/or callee. Returning an RVID determined for the callee to the caller is advantageous because the RVID preferably includes the callee name and information about the transfer.

Once a context for a call is determined, then context based ratings may be determined for the call. Context based ratings are preferably determined by a context rating service within a trusted telephone network or a telco application server.

Ratings may include numerical scales, alphanumeric scales, and other scale basis. For example, a numerical scale from "1 to 10" may rate different aspects of the caller or callee, such as the caller's knowledge of a subject. In another example, an alphanumerical scale may rate the typical content of a call by a caller or callee similarly to the ratings used by Motion Pictures of America (MPA). For example, a caller from a special interest group discussing the death penalty might use graphic terms and phrases to convey meaning, and therefore may have a context rating of "PG" or "R" associated with the call. A callee receiving the call would be required to have approval to answer calls with the context rating or may decide to block all calls with ratings higher than "PG".

The context rating service may access multiple diverse databases to determine context based ratings for a call. In particular, previous ratings may be accesses from local databases, global databases and group based databases within trusted telephone network 46 or accessible via network 20 outside trusted telephone network 46.

A caller or callee profile may include context based ratings. In addition, a profile for a business called on behalf of may include context based ratings. Further, ratings may be distinguished according to other portions of the context, such as a location or billing plan.

Advantageously, calls may be regulated according to the call context by a context regulation service. In particular, call regulation may include blocking a call, screening a call, and other regulatory functions. A caller may be regulated in the types of calls that may be placed. In addition, a callee may be regulated in the types of calls that may be received. For purposes of the present invention, a third party to a call preferably defines the criteria for regulating the call according to call context.

For purposes of illustration, the embodiment is described where a call may be regulated at intermediary device 42 or destination device 44. In alternate embodiments, a call may also be regulated at origin device 40.

Intermediary device 42 may access context regulation service 56 or context regulation service 51, where the context regulation service determines whether a call should be regulated based on the call context in view of third party regulatory criteria. In addition, destination device 44 may access context regulation services 56 and 51, as well as an internal context regulation service 60. Further, multiple context regulation services may be accessed simultaneously.

Context regulation services may access third party criteria from data storage systems inside or outside trusted telephone network 46. For example, a context regulation service may determine third party criteria from regulation criteria designated by a line number subscriber, where the party utilizing the line is not the line number subscriber. In another example, a context regulation service may determine third party criteria from regulation criteria designated by a telephone network provider, such as the controller of a PBX or call center.

In the present embodiment, for purposes of illustration, destination device 44 includes a PBX 58 that controls distribution of incoming telephone calls. In the example, PBX 58 includes a PBX controller 59 that may access a context regulation service 60 within PBX 60 and may access a context regulation service 56 via network 20. In alternate embodiments, origin device 40 and intermediary device 42 may also include a PBX or other network system. In addition, in alternate embodiments, destination device 44 may include a direct connection to a telephony device.

As an example of the flow of the present invention, intermediary device 42 receives a call request from origin device 40. A context for the call is determined and transferred to destination device 44. PBX controller 59 transfers the call context to context regulation service 60. Context regulation service 60 then determines whether, according to the call context, the call should be completely blocked, transferred to a screening destination device 64 for screening, or transferred to intended destination device 62 to reach the requested callee.

As another example of the flow of the present invention, intermediary device 42 receives a call request from origin device. A context for the call is determined and utilized by context regulation service 56 to determine whether the call should be blocked or transferred to destination device 44. In particular, the third party criteria is accessed by context regulation service 56 from the requested line subscriber regulation criteria.

One advantage of regulating calls at intermediary device 42 is the case where a third party may provide a wireless telephone service to an employee, but still regulate calls using the wireless telephone service according to call context. In such a case, a regulation option may include switching the billing for the call to the employee's billing plan, rather than the business's billing plan, where the context indicates that the call is not business related and the business does not want to pay for the call.

Advantageously, the identities of parties to a call and other context of the call are monitored during the call and call context is dynamically adjusted. As a call context adjusts, the regulations associated with the call context preferably also adjust.

Figure 4:
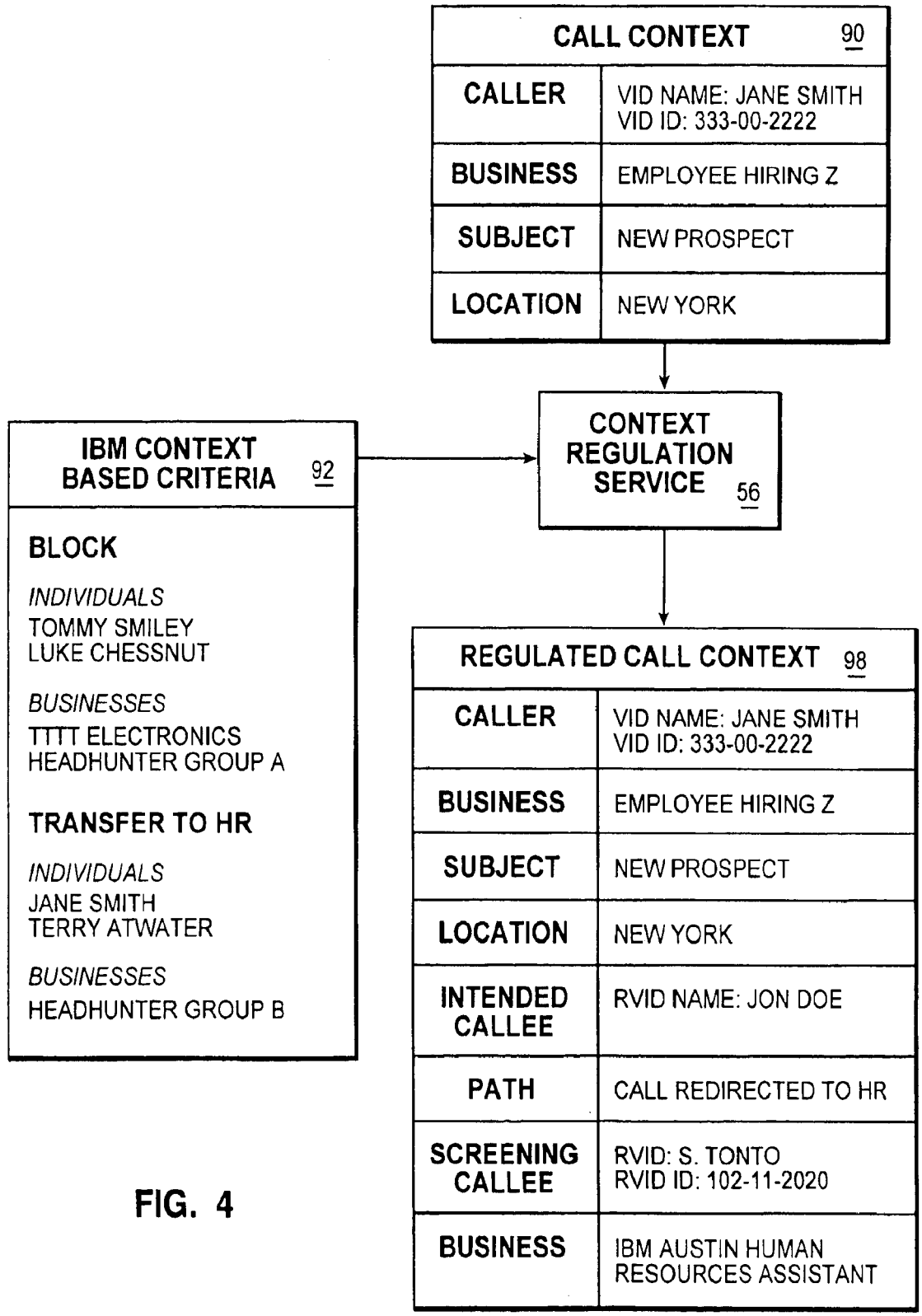
FIG. 4 illustrates an illustrative example of regulating all calls received to a line according to third party criteria in accordance with the method, system, and program of the present invention.

Referring now to FIG. 4, there is depicted an illustrative example of regulating all calls received to a line according to third party criteria in accordance with the method, system, and program of the present invention. Preferably, a context inference service determines a call context 90 for each incoming call including, but not limited to the identity of the caller, the business represented by the caller, the subject of the call, and the location of the call, as well as other context not depicted in the example.

Context regulation service 56 receives call context 90 and filters through any third party regulations for the line receiving the call. For example, IBM context based criteria 92 indicate third party regulations for the line. In the example, regulations for calls include blocking individuals and businesses and transferring calls to human resources (HR).

In the example, the caller identity is included in the list of individuals to transfer to HR. Therefore, context regulation service 56 updates the call context to indicate the regulation of the call. In particular, regulated call context 98 indicates the updated call context with the regulation of the call indicated. In alternate embodiments, other types of updates may be made to the context to regulate a call.

In an alternate example, if an employee were placing a call to "Jane Smith" from the line, context regulation service 56 would transfer the employee placing the call to human resources and allow human resources to contact "Jane Smith" and transfer the call to the employee if human resources approves the call.

For a business or individual, blocking call to or from an individual or business according to the identity of the individual or business, rather than just a line number used by that individual or business, is advantageous. In particular, if a business were to only block the line number utilized by a head hunter, the head hunter could quickly change to a new number and continue to call employees of the company with offers.

Figure 5:
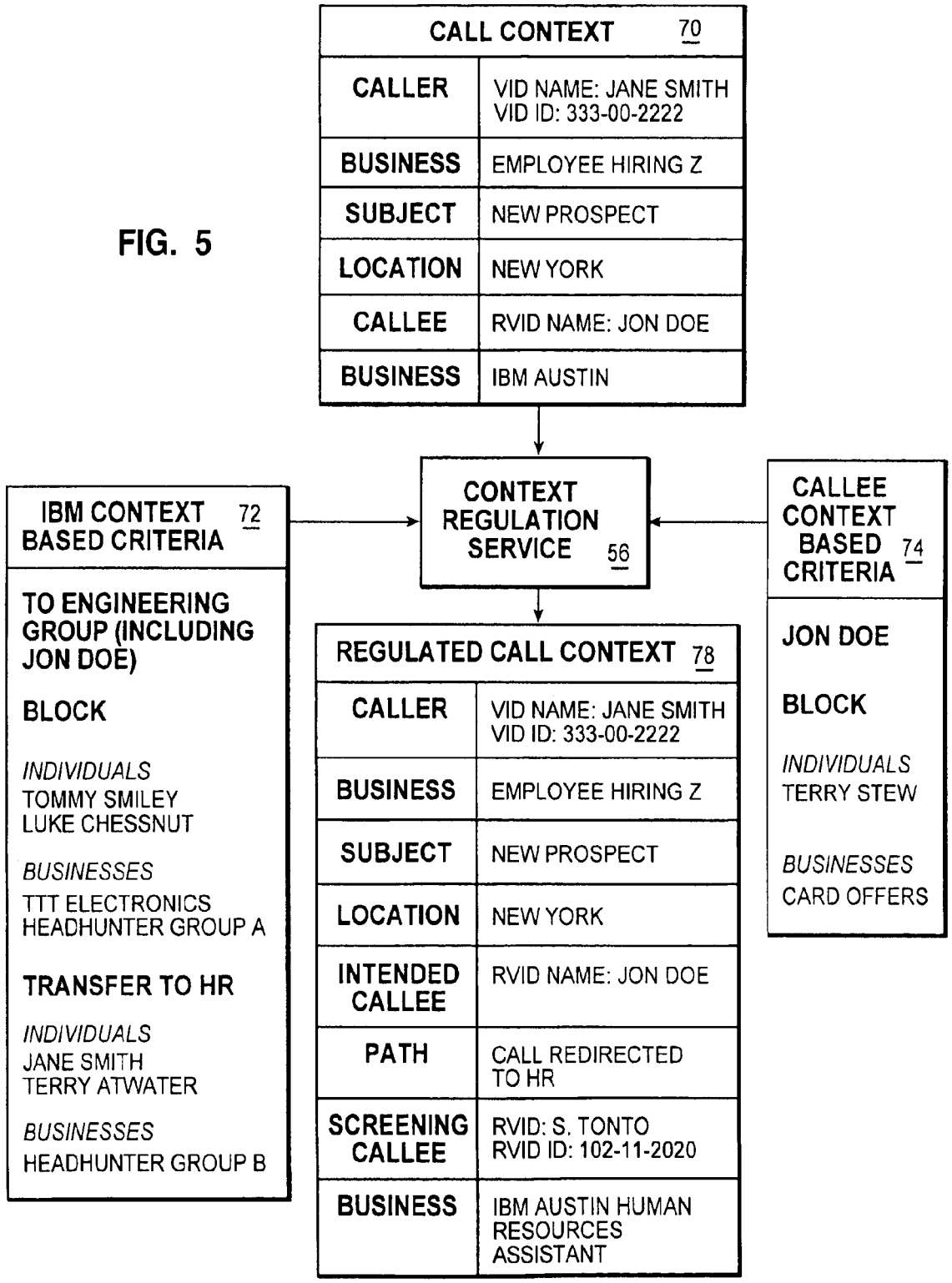
FIG. 5 depicts an illustrative example of regulating a call received according to third party criteria designated for a caller and callee pair in accordance with the method, system, and program of the present invention.

Referring now to FIG. 5, there is depicted an illustrative example of regulating a call received according to third party criteria designated for a caller and callee pair in accordance with the method, system, and program of the present invention. Preferably, a context inference service determines the context for a call including, but not limited to, the parties to the call, devices utilized for a call, line numbers accessed for a call, service providers for a call, billing plan for a call, location of parties to the call, subject matter of the call, billed transactions occurring during a call, parties called on behalf of for a call, backup parties accessed during a call, path of a call, and other context related information.

In the example, a call context 70 is determined including the caller identity, business called on behalf of, subject of the call, location of the caller, intended callee identity and business the callee receives calls on behalf of. In addition, other portions of the context not depicted may indicate the path of a call, ratings assigned to portions of the context, billing plans for the call, service providers for the call, scheduling of the parties to the call, and other available context.

A context regulation service 56 preferably receives call context 70 and determines whether the call should be regulated. Context regulation service 56 preferably accesses third party regulation criteria for determining call regulation. In the example, the third party criteria is IBM context based criteria 72. IBM context based criteria 72 is accessed for the business on behalf of whom the call is intended to be received. In particular, the third party criteria may be accessed in association with a particular line or in association with a call received by an employee at any line in order to regulate particular VID/RVID call pairs.

In the example, IBM context based criteria 72 includes the group of intended callees to which the criteria is to apply. Here, the engineering group includes "Jon Doe", the intended callee. Criteria to be applied to other groups and individuals may also be designated by IBM and filtered according to each call.

For the designated group of callees calls are blocked according to individual caller identities and according to business represented. In addition, for the designated group of callees calls are transferred to the human resources (HR) department for screening according to individual caller identity and businesses represented. Other types of regulation may also be incorporated.

For the example, "Jane Smith", the caller, is included in the transfer for screening category according to caller identity. Therefore, context regulation service 56, regulates the call by redirecting the call path to a screening callee. Where a call is screened, an employee may be reached or an automated process may be initiated. Preferably, the screening process allows a business to determine if the call should be continued with the intended callee or a message taken. In addition, the screening process may allow for the caller to provide incentives to the business for allowing the intended callee to receive the call. Further, the business may screen the call to determine whether the call should be blocked for future calls.

In addition, context regulation service 56 may access call context based criteria 74 in which the callee has personally designated criteria for regulating calls or a guardian or other authority has designated criteria for regulating calls. Here, the callee has indicate blocking preferences according to individual caller identity and businesses represented. Other types of regulation may also be incorporated. None of the criteria in callee context based criteria 74 are applicable to call context 70, however in alternate embodiments, call context 70 may be regulated according to both a third party and a callee criteria.

Context regulation service 56 adjusts call context 70 into regulated call context 78. In particular, the path of the call indicates that the call has been redirected to HR for screening. The identity of the screening callee is determined and the section of the business represented by the screening callee is identified. Context regulation service 56 may further interact with a context inference service when adjusting the context of a call.

Figure 6:
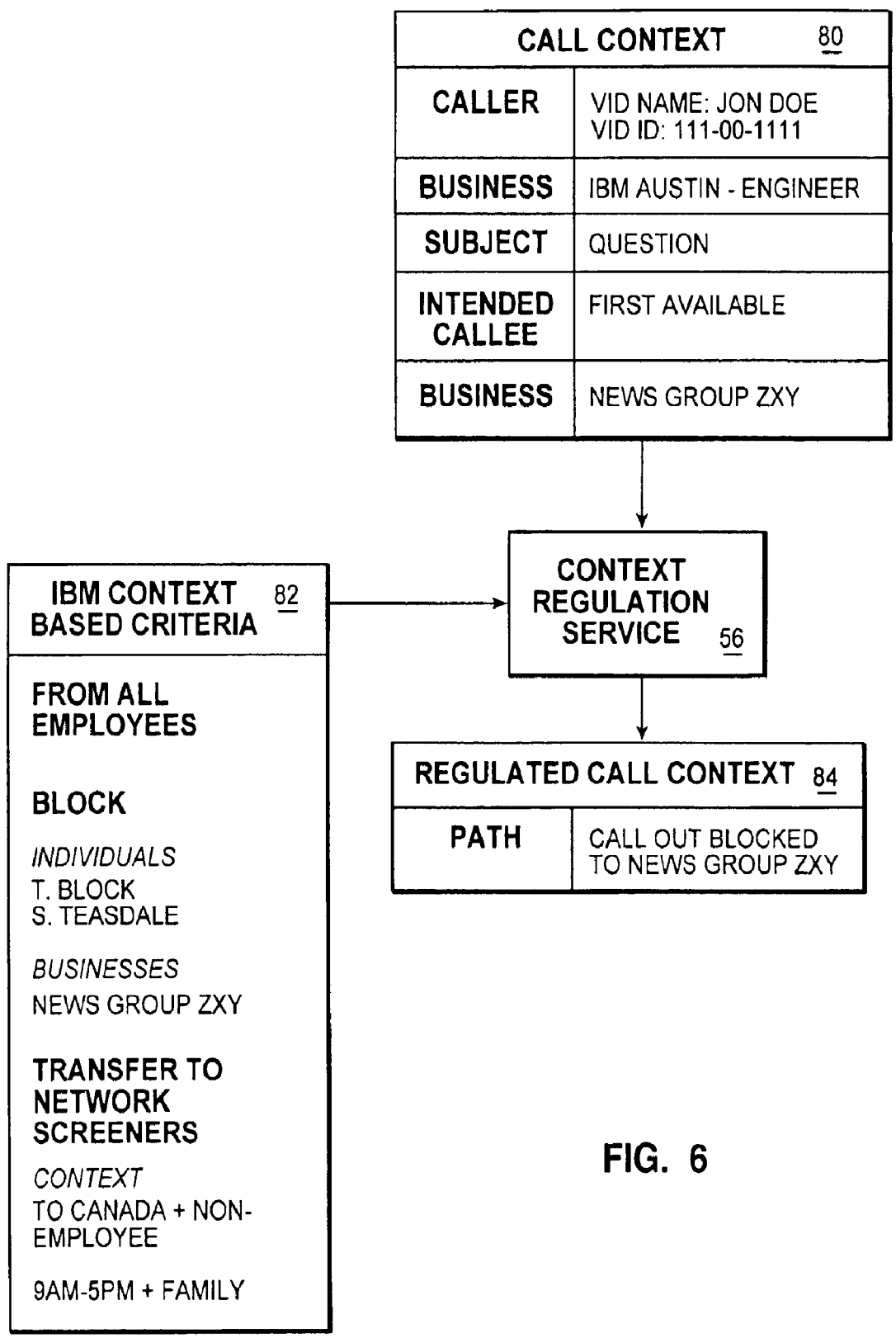
FIG. 6 illustrates an illustrative example of regulating an outgoing call according to third party criteria designated for a caller and callee pair in accordance with the method, system, and program of the present invention.

With reference now to FIG. 6, there is depicted an illustrative example of regulating an outgoing call according to third party criteria designated for a caller and callee pair in accordance with the method, system, and program of the present invention. In this example, a call context 80 indicates a caller identity and the section of business represented by the caller. In addition, call context 80 indicates the subject of the call, the intended callee and the business represented by the intended callee. Here, the intended callee is the first representative available for "News Group ZXY".

In this example, context regulation service 56 is regulating the calls that may be placed by employees of a business. Context regulation service 56 may be accessed from an origin device, intermediary device, or destination device, however advantageously call regulation is performed before the call is directed by the intermediary device. In addition, the example may apply where a business line is regulated or where any line used by an employee is regulated.

IBM context based criteria 82 include criteria for regulating calls from all employees of the business. As third party criteria, regulations include blocking calls and transferring calls to network screeners. For example, where a call is placed to Canada and the recipient is a non-employee, the call may be screened prior to allowing the call to continue. In another example, between business hours, if the intended callee is included in the family group for an employee, then the call may be screened. Screening may allow the employee to transfer charges for the call to the employee's billing plan or to provide additional information about the call.

In the example, the business represented by the intended callee is indicated as a blocked business for all employees. Therefore, context regulation service 56 preferably adjusts the path for the call, as indicated by regulated call context 84. When a call is blocked, a message indicating the reason for the blocked call may be output to the caller. For example, the message may indicate that call context did not indicate the call to be a business call.

While in this example, the entire call was blocked, in an alternate example, the third party criteria may block the caller's identity from being transferred, where the third party does not want to intended party to be able to capture the caller's identity. Further, regulation of a call may provide for flagging a call and monitoring that call for unauthorized business transactions or other context, where additional call regulation may occur during the call.

Figure 7:
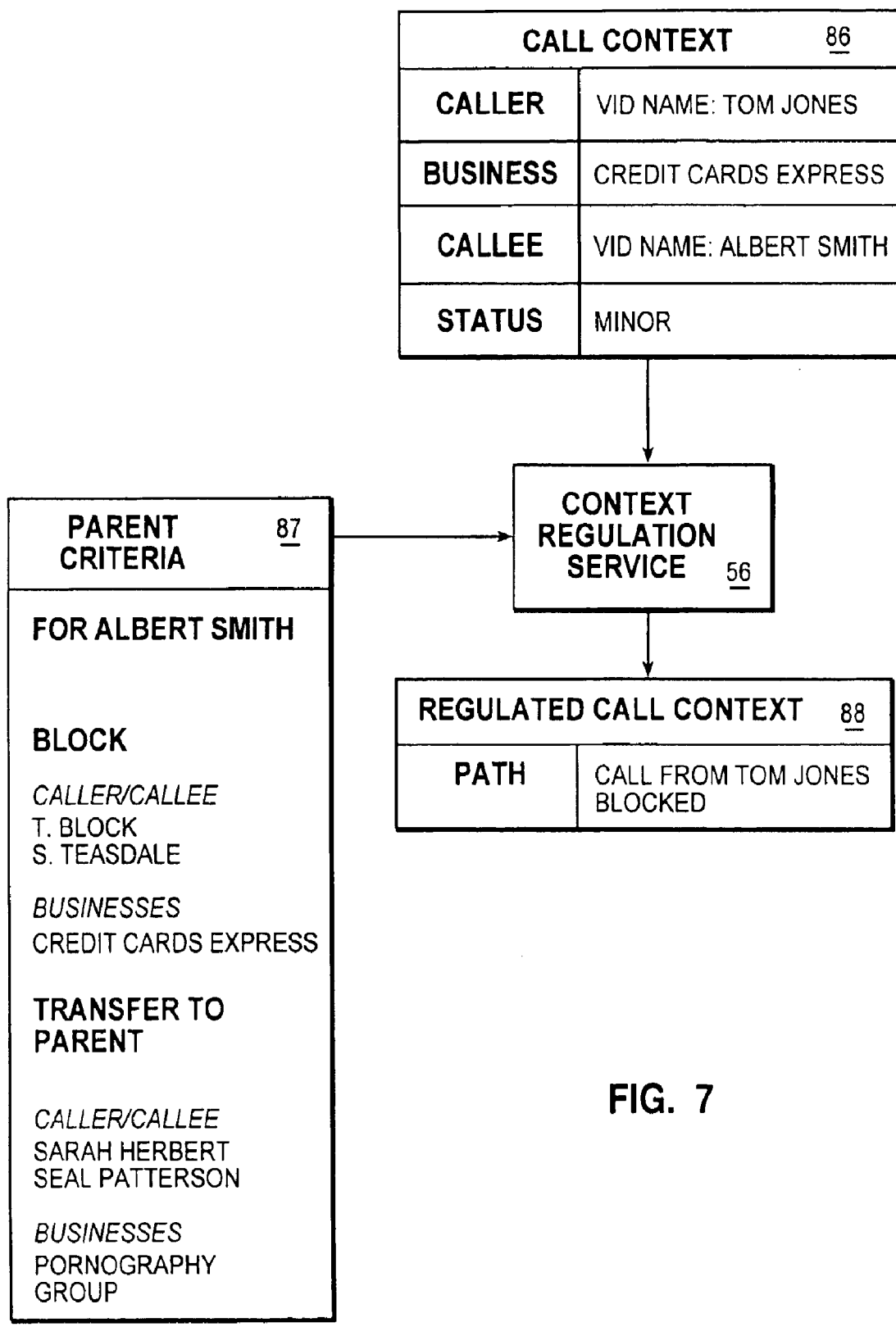
FIG. 7 depicts an illustrative example of regulating an outgoing call according to third party criteria for a caller and callee pair in accordance with the method, system, and program of the present invention.

Referring now to FIG. 7, there is illustrated an illustrative example of regulating an outgoing call according to third party criteria for a caller and callee pair in accordance with the method, system, and program of the present invention. As depicted a call context 86 indicates the caller identity, the business represented by the caller, the callee logged in for the call and the status of the callee.

Context regulation service 56 preferably receives call context 86 to regulate the call. In the example, a parent has designated criteria for regulating any calls received by or placed by a child, independent of the line utilized by the child for receiving or placing calls. Preferably, when the child's identity is detected as logging in to place or answer a call, parent criteria 87 is automatically accessed to regulate the call.

In filtering call context 86 with the parent criteria 87, it is determined that the business represented by the caller is included in a business designated to be blocked from calling or receiving calls from the "Albert Smith". Context regulation service 56 regulates the call by blocking the call. In particular, regulated call context 88 indicates the path of the call has been updated to block the call.

As another advantage, a parent or other third party may subscribe to or compile groups of types of individuals and businesses. In the example, parent criteria 87 includes regulating calls from any individual or business included in the pornography group. In other examples, other types of groups that include VIDs for individuals and businesses that are not allowed to solicit minors may also be provided.

In the previous examples, the third party providing regulations for calls was a business. In this example, the third party providing regulations for calls is a parent or other guardian. In alternate examples, it might be advantageous for a court to regulate calls between parties to a case or between a prosecutor and a juror.

Figure 8:
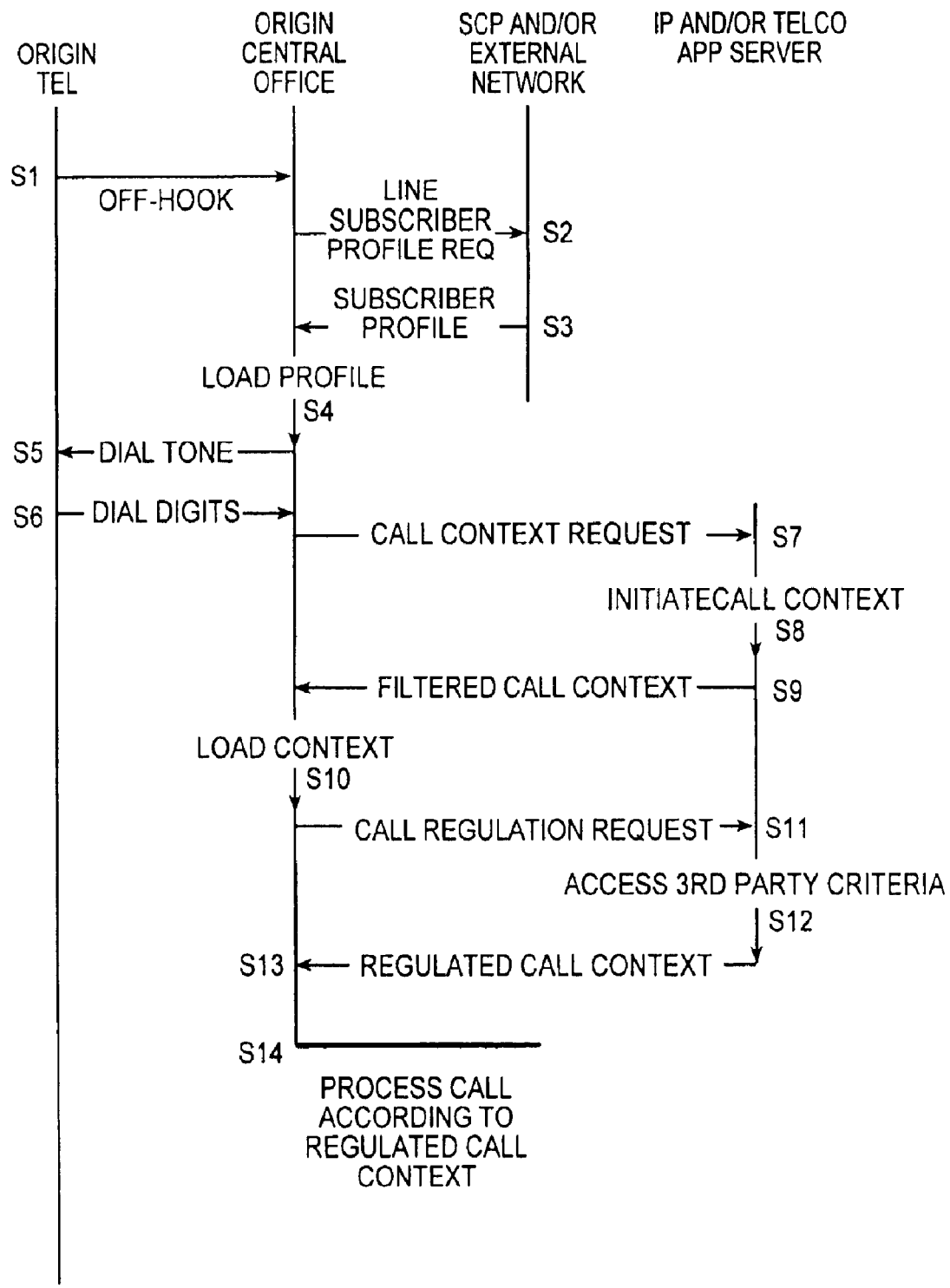
FIG. 8 illustrates a flow diagram of a signal flow and processing of a call in accordance with the method, system, and program of the present invention.

Referring now to FIG. 8, there is depicted a flow diagram of a signal flow and processing of a call in accordance with the method, system, and program of the present invention. A standard telephone device is assumed for the Atel@ origin device and destination device in the present example. However, a similar signal flow may be applied to other types of origin and destination devices, including server systems, private switching networks, and call centers. Further, the flow is described with reference to wireline devices, however is not limited in application to wireline devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. In addition, a caller may provide an intended callee identifier. Dialed digits may be received at other points in the process and loaded into the call register until needed for processing the call.

Next, the central office extends a call context request to a context inference service available from an IP or telco application server (step S7). A call context inference is initiated (step S8). The context inference service preferably accesses and loads a caller profile according to VID into the origin call register. Utilizing the line number, line subscriber profile, VID and caller profile, the context inference service preferably determines a context for the call.

The context inference service preferably filters the context and designates certain portions of the context for receipt by certain entities. The filtered call context is returned to the origin central office (step S9). Next, the context is loaded into the call register (step S10).

Advantageously, a call regulation request is transferred to an IP or telco application server functioning as a context regulation service (step S11). Next, the context regulation service initiates accessing third party regulation criteria from internal and external databases (step S12). Thereafter, a regulated call context is returned to the origin central office (step S13). The regulated call context may indicate no regulation, regulation before the call, and/or regulation during the call.

The call is preferably processed according to the regulated call context (step S14). In alternate embodiments, the origin device may include a PBX or call center that initiates regulation of the call before reaching the origin central office. In addition, in alternate embodiments, a destination central office may initiate the call regulation request or an additional call regulation request. Further, the destination device may initiate the call regulation request.

Figure 9:
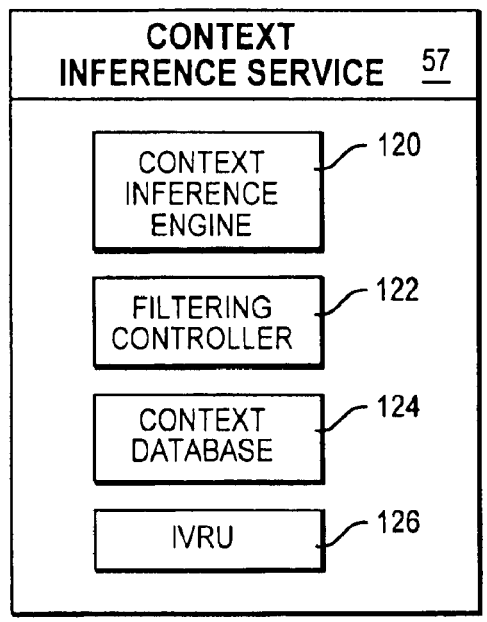
FIG. 9 depicts a block diagram of a context inference service in accordance with the method, system, and program of the present invention.

With reference now to FIG. 9, there is illustrated a block diagram of a context inference service in accordance with the method, system, and program of the present invention. Context inference service 57 is preferably housed within a computing system including at least a processor, memory, system software, application software, and network software that execute to provide a telco service.

In particular, context inference service 57 includes a context inference engine 120. Context inference engine 120 preferably determines the context for a call through information accessible for the call and through inferences from that information. In addition, context inference engine 120 may filter context information for each entity receiving that information.

A filtering controller 122 preferably filters context determined by context inference engine 120 according to filtering preferences of the caller. In addition, the line number subscriber may designate filtering preferences for context including the line number.

A context database 124 preferably records and stores context for each call processed by context inference service 57. Context database 124 may be later accessed to provide verification and context for billed call transactions. In addition, context database 124 may store records of lengths of calls such that lengths of future calls may be predicted.

An interactive voice recognition unit (IVRU) 126 preferably prompts the caller and callee to provide information required for determining context and detects caller or callee entries. In addition, IVRU 126 may prompt the caller and callee to designate additional preferences for filtering context.

Figure 10:
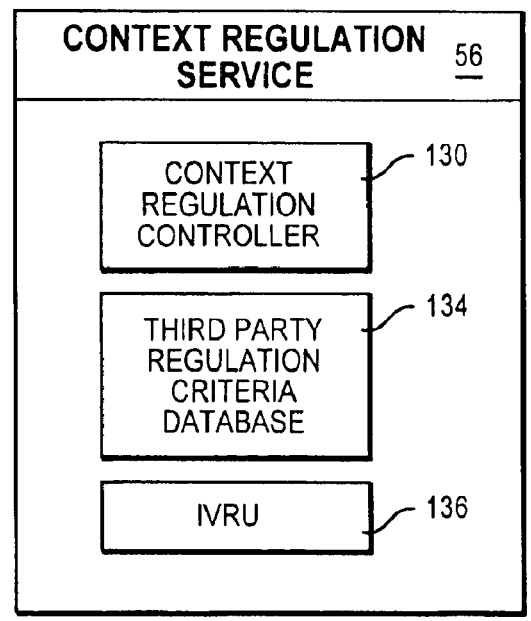
FIG. 10 illustrates a block diagram of a context regulation service in accordance with the method, system, and program of the present invention.

Referring now to FIG. 10, there is illustrated a block diagram of a context regulation service in accordance with the method, system, and program of the present invention. Context regulation service 56 is preferably housed within a computing system including at least a processor, memory, system software, application software, and network software that execute to provide a telco service.

In particular, context regulation service 56 includes a context regulation controller 130. Context regulation controller 130 preferably receives the context for a call, searches for relevant third party regulation criteria, and determines a regulated call context for a call according to the third party regulation criteria.

A third party regulation criteria database 134 may store third party regulation criteria utilized by context regulation controller 130. In addition, context regulation controller 130 may access third party regulation criteria from databases external to context regulation service 56.

An IVRU 136 may prompt a third party to provide regulation criteria for a particular call context or to enter regulation criteria in general. Additionally, IVRU 136 may prompt a caller and callee with information about the regulation of a particular call.

Figure 11:
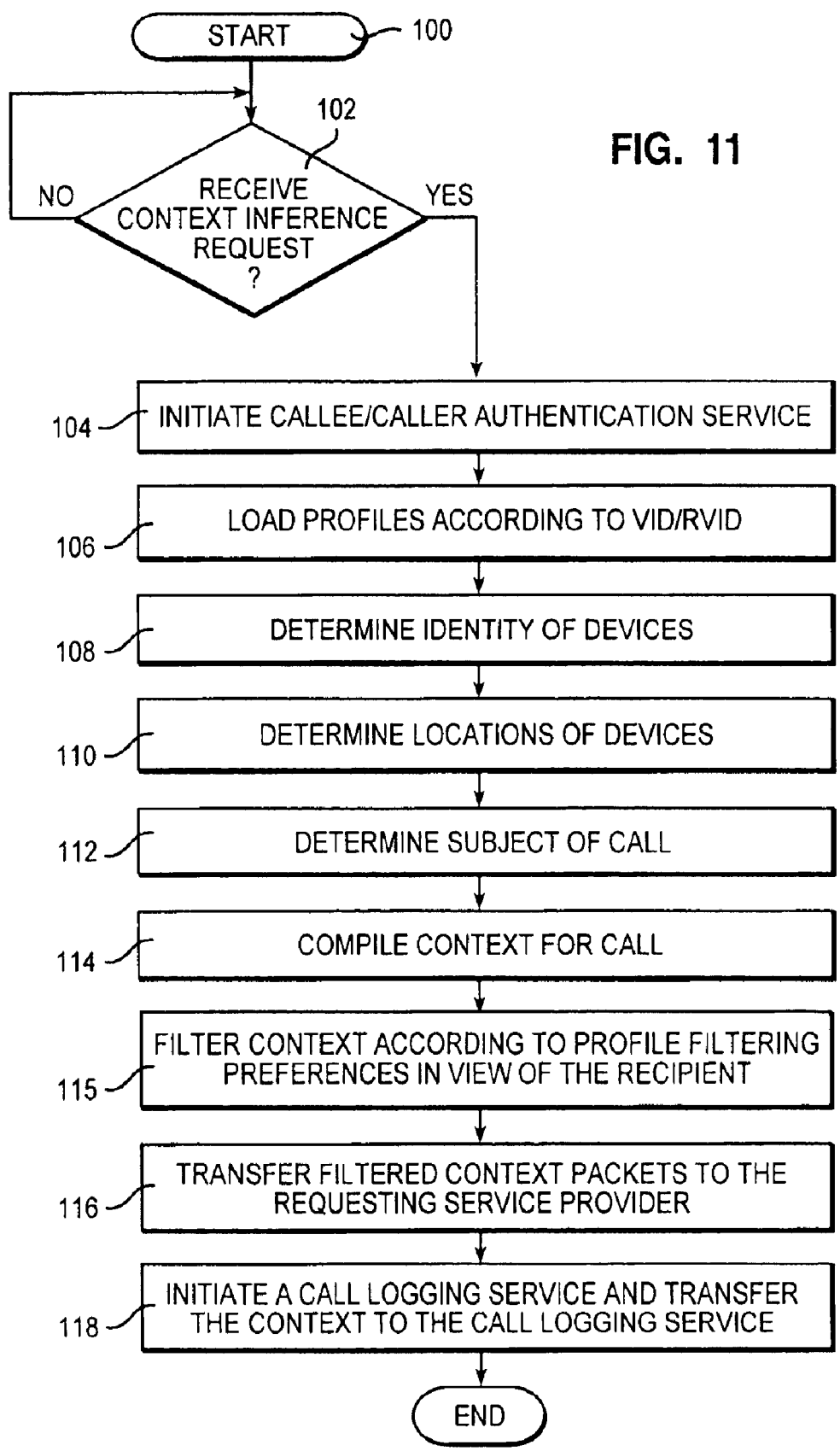
FIG. 11 depicts a high level logic flowchart of a process and program for controlling a context inference service in accordance with the method, system, and program of the present invention.

Referring now to FIG. 11, there is illustrated a high level logic flowchart of a process and program for determining call context in accordance with the present invention. As depicted, the process starts at block 100 and thereafter proceeds to block 102. Block 102 illustrates a determination as to whether a call context request is received. If a call context request is not received, then the process iterates at block 102. If call context request is received, then the process passes to block 104. A call context request may also include line subscriber profile information and other call information already loaded by the requesting service provider.

Block 104 depicts initiating a caller/callee identity authentication service. Next, block 106 illustrates loading profiles according to the VID/RVID authenticated for the caller/callee. Alternatively, VID/RVID for the call may be transferred with the call context request.

Next, block 108 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, and other available profile information.

Block 110 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 112 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to indicate the subject matter of a call.

Thereafter, block 114 depicts compiling the context information for a call. In compiling context information, the information utilized to determine context is preferably consolidated into general context categories. In addition, block 115 illustrates filtering the context information for a call according to caller and callee profile preferences. Next, block 116 illustrates transferring the call context to the requesting service provider.

Block 118 depicts initiating a call logging service and transferring the call context to the call logging service, and the process ends. In particular, a caller or callee profile may indicate call logging preferences that are included in the context transferred to the call logging service. Alternatively, the call logging service may access call logging preferences for the caller, callee, or third party.

Figure 12:
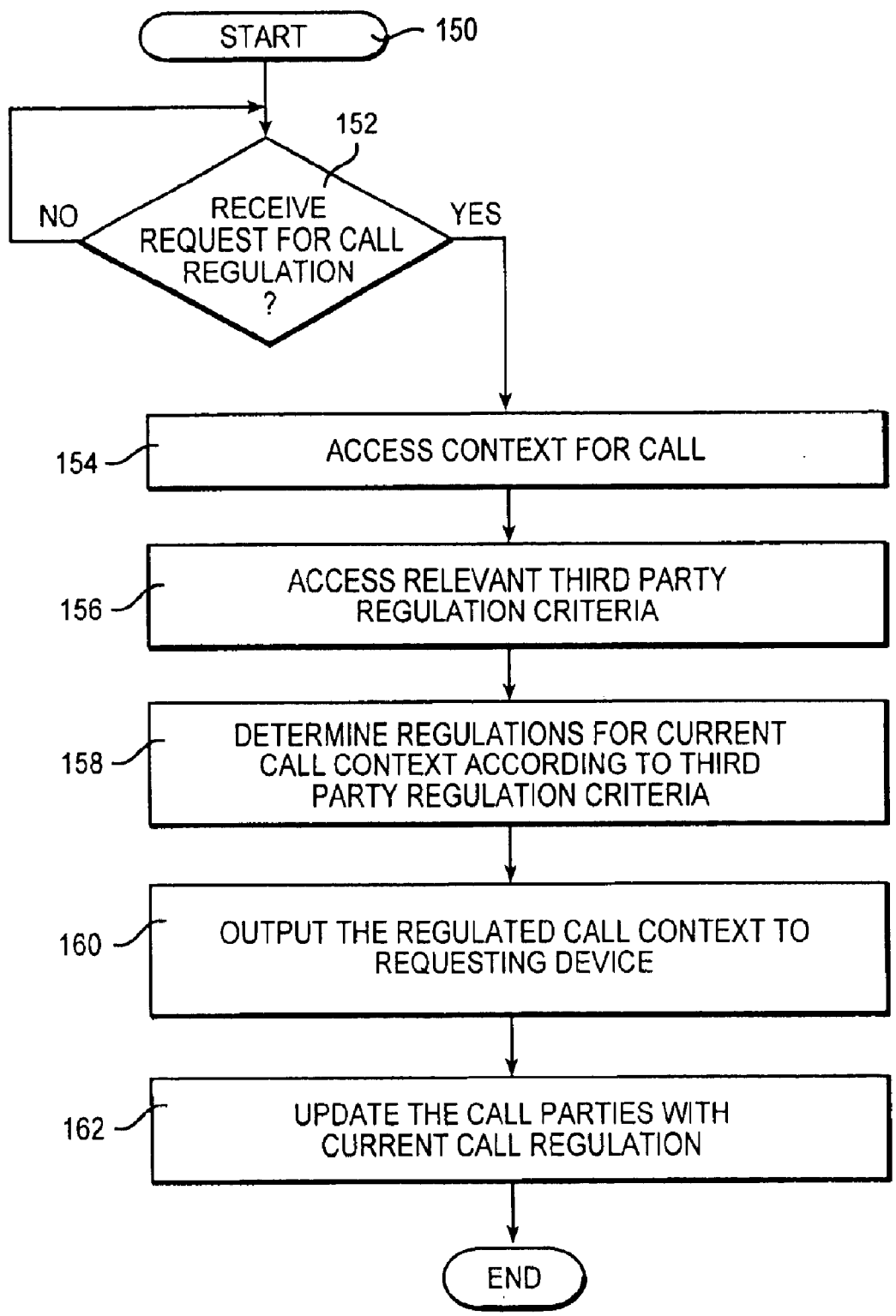
FIG. 12 illustrates a high level logic flowchart of a process and program for controlling a context regulation service in accordance with the method, system, and program of the present invention.

With reference now to FIG. 12, there is depicted a high level logic flowchart of a process and program for controlling a context regulation service in accordance with the method, system, and program of the present invention. As illustrated, the process starts at block 150 and thereafter proceeds to block 152.

Block 152 depicts a determination as to whether or not a request for call regulation is received. If a request is not received, then the process iterates at block 152. If a request is received, then the process passes to block 154.

Block 154 illustrates accessing the context for the call. The context may be accessed with the request for call regulation or from a context inference service accessed by the context regulation service. Next, block 156 depicts accessing relevant third party regulation criteria. Third party regulation criteria is preferably filtered to determine those portions of the criteria that are relevant for the current context. Third party regulation criteria may be accessed for third parties that are the line subscribers to the line numbers utilized for a call. In addition, third party regulation criteria may be accessed for third parties that are represented by a party to a call. Further, third party regulation criteria for other types of third parties may be accessed.

Block 158 depicts determining the regulations for the current call context according to the third party regulation criteria. Regulation criteria may include blocking calls completely, transferring the call to a screening process, blocking portions of the context of a call from access by one of the parties to the call, monitoring the call while in progress and regulating certain actions, and other types of regulatory actions that may be performed on a call. In addition, regulation criteria may include not performing any regulation on a call. For example, while calls made by employees in general may be regulated, another criteria may require not regulating a manager's calls.

Block 160 illustrates controlling output of the regulated call context to the requesting device. An origin device, intermediary device, destination device, or service may request the regulated call context. Next, block 162 depicts updating the call parties with the current call regulation, and the process ends. For example, a textual or audio output may be transferred to the origin and/or destination devices for output to the parties to the call. In particular, where a call is transferred for screening, the intended callee may still receive a textual or audio prompt indicating the regulated call path.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for regulating calls, comprising:

detecting an identity of a caller to a call and an identity of a callee logged in to receive said call;

accessing a selection of third party criteria for regulating a call between said caller identity and said callee identity; and regulating a communication channel between said caller and said callee according to said selection of third party criteria.

2. The method for regulating calls according to claim 1, wherein detecting an identity further comprises:

authenticating said identity of said caller from a voice authentication of a voice utterance by said caller; and
   authenticating said identity of said callee from a voice authenticated of a voice utterance by said callee.

3. The method for regulating calls according to claim 1, wherein accessing a selection further comprises:

accessing said selection of third party criteria specified by a third party with authority over said caller independent of a caller profile associated with said caller identity.

4. The method for regulating calls according to claim 1, wherein accessing a selection further comprises:

accessing said selection of third party criteria specified by a third party with authority over said callee independent of a callee profile associated with said callee identity.

5. The method for regulating calls according to claim 1, wherein accessing a selection further comprises:

accessing said selection of third party criteria by a third party providing at least one line utilized for said call.

6. The method for regulating calls according to claim 1, wherein accessing a selection further comprises:

accessing said selection of third party criteria by a third party independent of any line utilized for said call.

7. The method for regulating calls according to claim 1, wherein accessing a selection further comprises:

accessing said selection of third party criteria from a data storage system accessible outside a trusted telephone network processing said call.

8. The method for regulating calls according to claim 1, wherein accessing a selection further comprises:

accessing said selection of third party criteria from a data storage system accessible within a trusted telephone network processing said call.

9. The method for regulating calls according to claim 1, wherein regulating said communication channel further comprises blocking said communication channel.

10. The method for regulating calls according to claim 1, wherein regulating said communication channel further comprises opening said communication channel.

11. The method for regulating calls according to claim 1, wherein regulating said communication channel further comprises transferring said call to a screening process.

12. The method for regulating calls according to claim 1, further comprising:

detecting at least one context identifier for said call in addition to said identity of said caller and said identity of said callee, wherein said at least one context identifier comprises at least one from among an identity of a business party called on behalf of by said caller, an identity of a business party receiving said call through said callee, an identifier of a device used by said caller, an identifier of a device used by said callee, a location of said caller, a location of said callee, an intended subject matter of said call, a path of said call; and accessing said selection of third party criteria for regulating said call based on said at least one context identifier in addition to said identity of said caller and said identity of said callee.

13. The method for regulating calls according to claim 1, further comprising:

selecting an inferred context for said call, wherein said inferred context comprises a rating level for said call; and accessing said selection of third party criteria for regulating said call based on said identity of said caller and said identity of said callee and said inferred context.

14. The method for regulating calls according to claim 1, wherein regulating a communication channel between said caller and said callee according to said selection of third party criteria, further comprises:

blocking transfer of at least one from among a caller identity to said callee and said callee caller as required by said selection of third party criteria.

15. The method for regulating calls according to claim 1, wherein said third party criteria is designated independent of a caller profile accessible for said caller identity and a callee profile accessible for said callee identity.

16. A system for regulating calls, comprising:
a communication system for enabling a call from a caller to a callee;
means for detecting an identity of said caller to said call and an identity of said callee logged in to receive said call;
means for accessing a selection of third party criteria for regulating a call between said caller identity and said callee identity; and
means for regulating a communication channel through said communication system between said caller and said callee according to said selection of third party criteria.

17. The system for regulating calls according to claim 16, wherein said means for detecting an identity further comprises:
means for authenticating said identity of said caller from a voice authentication of a voice utterance by said caller; and
means for authenticating said identity of said callee from a voice authenticated of a voice utterance by said callee.

18. The system for regulating calls according to claim 16, wherein said means for accessing a selection further comprises:
means for accessing said selection of third party criteria specified by a third party with authority over said caller independent of a caller profile associated with said caller identity.

19. The system for regulating calls according to claim 16, wherein said means for accessing a selection further comprises:
means for accessing said selection of third party criteria specified by a third party with authority over said callee independent of a callee profile associated with said callee identity.

20. The system for regulating calls according to claim 16, wherein said means for accessing a selection further comprises:
means for accessing said selection of third party criteria by a third party providing at least one line utilized for said call.

21. The system for regulating calls according to claim 16, wherein said means for accessing a selection further comprises:
means for accessing said selection of third party criteria by a third party independent of any line utilized for said call.

22. The system for regulating calls according to claim 16, wherein said means for accessing a selection further comprises:
means for accessing said selection of third party criteria from a data storage system accessible outside a trusted telephone network processing said call.

23. The system for regulating calls according to claim 16, wherein said means for accessing a selection further comprises:
means for accessing said selection of third party criteria from a data storage system accessible within a trusted telephone network processing said call.

24. The system for regulating calls according to claim 16, wherein said means for regulating said communication channel further comprises means for blocking said communication channel.

25. The system for regulating calls according to claim 16, wherein said means for regulating said communication channel further comprises means for opening said communication channel.

26. The system for regulating calls according to claim 16, wherein said means for regulating said communication channel further comprises means for transferring said call to a screening process.

27. A computer program product for regulating calls, comprising:
a recording medium;
means, recorded on said recording medium, for detecting an identity of a caller to a call and an identity of a callee logged in to receive said call;
means, recorded on said recording medium, for accessing a selection of third party criteria for regulating a call between said caller identity and said callee identity; and
means, recorded on said recording medium, for regulating a communication channel between said caller and said callee according to said selection of third party criteria.

28. The computer program product for regulating calls according to claim 27, further comprising:
means, recorded on said recording medium, for authenticating said identity of said caller from a voice authentication of a voice utterance by said caller; and
means, recorded on said recording medium, for authenticating said identity of said callee from a voice authenticated of a voice utterance by said callee.

29. The computer program product for regulating calls according to claim 27, further comprising:
means, recorded on said recording medium, for accessing said selection of third party criteria for said caller identity.

30. The computer program product for regulating calls according to claim 27, further comprising:
means, recorded on said recording medium, for accessing said selection of third party criteria for said callee identity.

31. The computer program product for regulating calls according to claim 27, further comprising:
means, recorded on said recording medium, for accessing said selection of third party criteria specified by a third party with authority over said caller independent of a caller profile associated with said caller identity.

32. The computer program product for regulating calls according to claim 27, further comprising:
means, recorded on said recording medium, for accessing said selection of third party criteria specified by a third party with authority over said callee independent of a callee profile associated with said callee identity.

33. The computer program product for regulating calls according to claim 27, further comprising:
means, recorded on said recording medium, for accessing said selection of third party criteria by a third party providing at least one line utilized for said call.

34. The computer program product for regulating calls according to claim 27, further comprising:
means, recorded on said recording medium, for accessing said selection of third party criteria by a third party independent of any line utilized for said call.

35. The computer program product for regulating calls according to claim 27, further comprising:

means, recorded on said recording medium, for accessing said selection of third party criteria from a data storage system accessible outside a trusted telephone network processing said call.

36. The computer program product for regulating calls according to claim 27, further comprising:

means, recorded on said recording medium, for accessing said selection of third party criteria from a data storage system accessible within a trusted telephone network processing said call.

37. The computer program product for regulating calls according to claim 27, wherein said means for regulating said communication channel further comprises means, recorded on said recording medium, for blocking said communication channel.

38. The computer program product for regulating calls according to claim 27, wherein said means for regulating said communication channel further comprises means, recorded on said recording medium, for opening said communication channel.

39. The computer program product for regulating calls according to claim 27, wherein said means for regulating said communication channel further comprises means, recorded on said recording medium, for transferring said call to a screening process.

\* \* \* \* \*

UNITED STATES PATENT AND TRADEMARK OFFICE
CERTIFICATE OF CORRECTION

PATENT NO. : 6,917,672 B2  
DATED : July 12, 2005  
INVENTOR(S) : Michael Wayne Brown et al.

It is certified that error appears in the above-identified patent and that said Letters Patent is hereby corrected as shown below:

Column 25,  
Line 2, insert -- identity to said -- after "identity to said callee and said callee" and before "caller as required".

Signed and Sealed this

Eighth Day of November, 2005

JON W. DUDAS  
*Director of the United States Patent and Trademark Office*